(12) United States Patent
Bowen et al.

(10) Patent No.: US 6,292,200 B1
(45) Date of Patent: Sep. 18, 2001

(54) APPARATUS AND METHOD FOR UTILIZING MULTIPLE RENDERING PIPES FOR A SINGLE 3-D DISPLAY

(75) Inventors: Andrew Bowen, San Jose; Dawn Maxon, Belmont; Gregory Buchner, Los Altos, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/177,911

(22) Filed: Oct. 23, 1998

(51) Int. Cl.[7] .................................................. G06T 1/20
(52) U.S. Cl. ............................ 345/506; 345/520; 709/251
(58) Field of Search .................................. 345/501–506, 345/520, 507–509, 419, 530, 545, 541, 544; 709/251, 238

(56) References Cited

U.S. PATENT DOCUMENTS 5,841,444 * 11/1998 Mun et al. ............................ 345/506

OTHER PUBLICATIONS

"PixelFlow: The Realization", Eyles et al, 1997 SIGGRAPH/Eurographics Workshop, ACM digital Library, pp. 57–68, Aug. 3–4, 1997.*

* cited by examiner

*Primary Examiner*—Kee M. Tung
(74) *Attorney, Agent, or Firm*—Wagner, Murabito & Hao LLP

(57) ABSTRACT

A computer graphics system having a hyperpipe architecture. Multiple rendering pipes are coupled together through a hyperpipe network scheme. Each of the rendering pipes are capable of rendering primitives for an entire frame or portions thereof. This enables multiple rendering pipes to process graphics data at the same time. A controller coordinates the multiple rendering pipes by sending requests to the appropriate rendering pipes to retrieve the pixel data generated by that particular pipe. It then merges the pixel data received from the various rendering pipes. A single driver then draws the three-dimensional image out for display.

18 Claims, 6 Drawing Sheets

APPARATUS AND METHOD FOR UTILIZING MULTIPLE RENDERING PIPES FOR A SINGLE 3-D DISPLAY

FIELD OF THE INVENTION

The present invention relates the field of computer graphics. More particularly, the present invention pertains to an apparatus and method for utilizing multiple rendering pipes for the generation of a single 3-D display.

BACKGROUND OF THE INVENTION

Today, computer graphics is used in a wide variety of applications, such as in business, science, animation, simulation, computer-aided design, process control, electronic publication, etc. In an effort to portray a more realistic real-world representation, three dimensional objects are transformed into models having the illusion of depth for display onto a two-dimensional computer screen. This is accomplished by using a number of polygons to represent a three-dimensional object. Complex three-dimensional objects may require upwards of hundreds of polygons in order to form an accurate model. Hence, a three-dimensional object can be readily manipulated (e.g., displayed in a different location, rotated, scaled, etc.) by processing the individual respective polygons corresponding to that object. Next, a scan conversion process is used to determine which pixels of a computer display fall within each of the specified polygons. Thereupon, texture is applied to only those pixels residing within specified polygons. In addition, hidden or obscured surfaces, which are normally not visible, are eliminated from view. Hence, displaying a three dimensional object on a computer system is a rather complicated task and can require a tremendous amount of processing power.

This is especially true for those cases involving dynamic computer graphics for displaying three-dimensional objects that are in motion. In order to simulate smooth motion, the computer system should have a frame rate of at least 30 hertz. In other words, new images should be updated, redrawn and displayed at least thirty times a second. This imposes a heavy processing and computational burden on the computer system. Indeed, even more processing power is required for interactive computer graphics, where displayed images change in response to a user input and where there are multiple objects in a richly detailed scene.

However, each extra object that is added into a scene needs to be modeled, scan converted, textured, Z-buffered for depth, etc., all of which, adds to the amount of processing resources that is required. In addition, it would be highly preferable if lghting, shadowing, shading, and fog could be included as part of the 3-D scene. Generating these special effects, again, consumes valuable processing resources. Hence, a major problem associated with producing realistic three-dimensional scenes is that it requires such a tremendous amount of processing power. The "richer" and more realistic a scene becomes, the more processing power that is required to render that scene. Moreover, speed becomes a major limiting factor as the computer must render millions of pixels in order to produce these amazingly complex scenes in less than one thirtieth (1/30) of a second.

Even though the processing power of computer systems continues to improve, there exists whole markets which demand even greater and greater processing power. Certain purchasers (e.g., drug companies, oil exploration, medical imaging, film studios, etc.) will pay a premium to obtain even faster and more powerful computer for rendering 3-D images.

In the past, there have been attempts to utilize several rendering engines in a single computer system in order to perform parallel processing. Each of these rendering engines is used to render one particular frame of image. While one rendering engine is in the process of generating one frame's worth of image data, another separate rendering engine is simultaneously generating the next frame's worth of image data. Meanwhile, other rendering engines can simultaneously be processing subsequent frames, etc. The digital-to-analog (DAC) outputs of each of these rendering engines are wired together to drive the cathode ray tube (CRT) display screen. By rendering multiple frames's worth of data at the same time with multiple rendering engines, the computer's overall processing speed is increased.

Unfortunately, however, there are some drawbacks to this way of ganging together multiple rendering engines. First, since there are multiple DACs driving the same CRT screen, there tends to be some scintillation between frames as DACs are switched from frame to frame. Furthermore, there are serious synchronization problems in order to properly coordinate the activities amongst all the rendering engines and their respective DACs.

Thus, there exists a need for some apparatus or method which increases the rendering power and speed of a 3-D computer system without sacrificing picture quality or increasing programming complexity in an unacceptable way. The present invention provides a novel solution by having one output controller which requests and receives data from multiple rendering engines. This effectively resolves virtually all problems associated with using multiple rendering engines. Furthermore, with the present invention, multiple rendering engines can now contribute to the generation of one single frame. The end result is that processing power and speed is dramatically improved with minimal or no discernible degradation to the displayed images.

SUMMARY OF THE INVENTION

The present invention pertains to a computer graphics system having a hyperpipe architecture. The hyperpipe architecture includes multiple rendering pipes. Each of the rendering pipes is capable of rendering pixels for an entire frame or portions thereof. This enables multiple rendering pipes to process graphics data at the same time. The pixel data generated by a rendering pipe is stored in its local memory. The multiple rendering pipes are coupled together through a hyperpipe network scheme. A controller coordinates the multiple rendering pipes by sending requests to the appropriate rendering pipes to retrieve the pixel data generated by that particular pipe. It then merges the pixel data received from the various rendering pipes into a frame's worth of data. A single driver is then used to draw that frame out for display. Thereby, rather than having just one rendering circuit working on a frame, multiple rendering circuits can operate in parallel on generating a frame's worth of pixel data. In the meantime, other rendering pipes can optionally be used to generate subsequent frames. This increases the system's overall rendering power and speed. By simply adding additional rendering pipes onto the hyperpipe network, the computer system's rendering capabilities can be readily scaled up to meet cost and graphics demands.

In the currently preferred embodiment of the present invention, a uni-directional, point-to-point ring topology is used. The hyperpipe network consists of a broad band packetized protocol with error correction. This scheme is preferred because of its relatively fixed and predictable latency. A fixed latency is desired as it allows the controller to send out requests ahead of when the pixel data will actually be used.

In one embodiment of the present invention, each of the rendering pipes includes a host processor, a geometry engine, a rasterizer, a frame buffer, and a display unit. A graphics application runs on the host processor and issues high-level commands and graphics data. The geometry engine performs arithmetic operations involving geometric calculations on the vertices of primitives used to render the threedimensional images. The rasterizer then fills the primitives and stores the resulting pixel data in its local frame buffer memory. A display unit can either request and receive video data packets from it's local pipe, or make similar requests over the hyperpipe. Other display units on the remote pipes can receive these requests and route the responses back on to the hyperpipe network. The master, or consumer, pipe then performs all the video backend processing on the data, e.g., color mapping, resizing, color space conversion, and gamma correction, and sends it to the output display device as a coherent video stream. A single controller designated as the controller issues the requests the rendering pipes and merges the received pixel data. A single driver then takes the merged data and drives a display monitor.

BRIEF DESCRIPTON OF THE DRAWINGS

The operation of this invention can be best visualized by reference to the drawings.

DETAILED DESCRIPTION

An apparatus and method for utilizing multiple rendering pipes for the generation of a single 3-D display is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
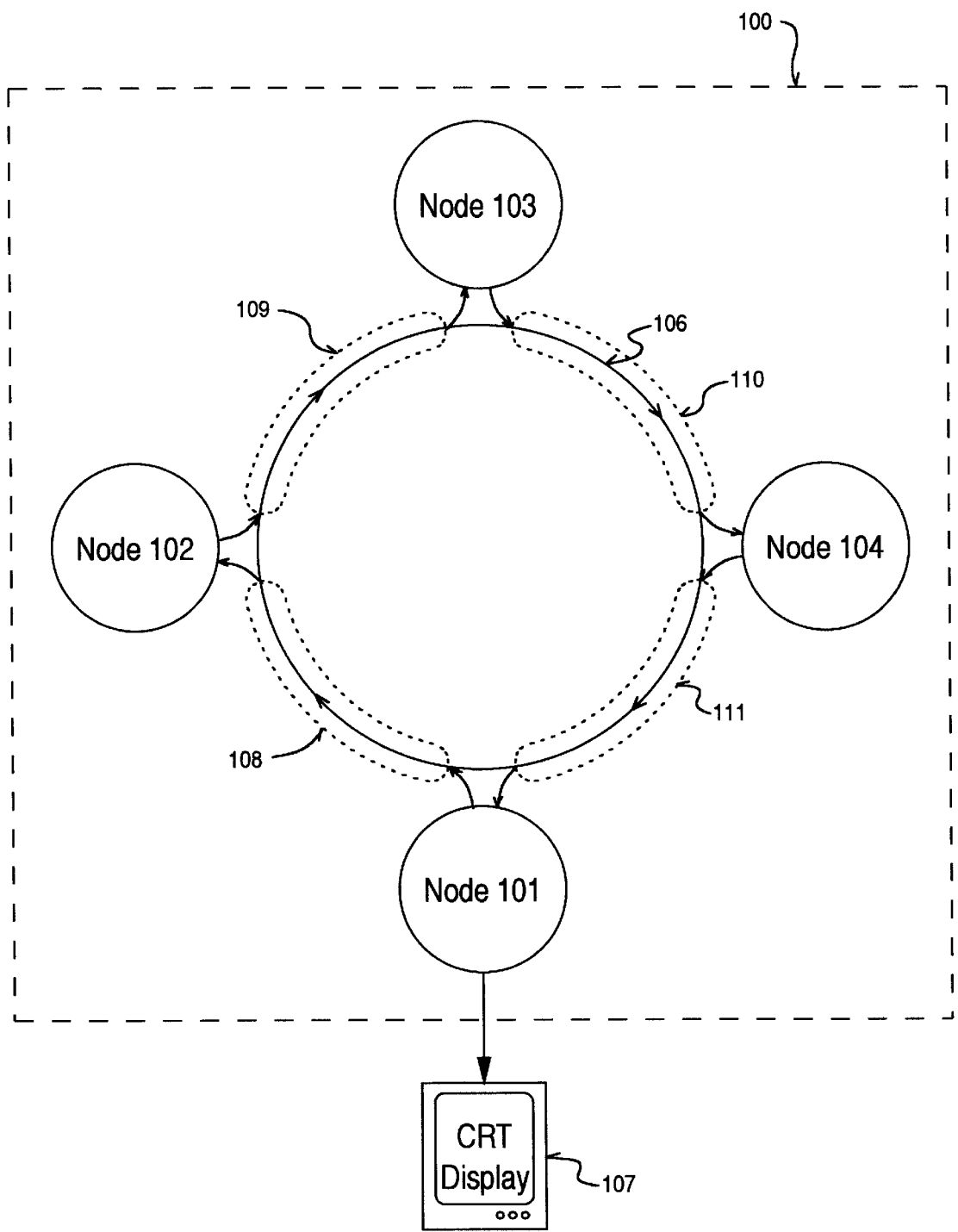
FIG. 1 shows a high-level diagram of a computer architecture upon which the present invention may be practiced.

Referring now to FIG. 1, a high-level diagram of a computer architecture upon which the present invention may be practiced is shown. The computer system 100 includes multiple processing nodes. Although four such nodes 101–104 are shown, any number of such nodes can be implemented. In general, adding more nodes proportionally increases the speed and processing power of the computer system 100. Each processing node is capable of performing rendering operations independently of the other nodes. The term "pipe" has been coined to refer to a rendering node. In the currently preferred embodiment of the present invention, each of these rendering nodes or pipes 101–104 is the same as any other node or pipe. The only difference is that a single one of the pipes is designated as being the "consumer." Since all rendering pipes are the same, it does not matter which particular pipe becomes the consumer. For example, node 101 can be selected as being the consumer.

It is the function of the consumer to gather the requisite data from all the appropriate pipes in order to draw the image for display on CRT display screen 107. The consumer 101 gets the requisite data by generating requests and sending the requests onto a bus network interconnect 106. Bus/network 106 can be any high-bandwidth bus or network for transmission of digital data (e.g., ethernet, ATM, SONET, FDDI, etc.). In the currently preferred embodiment, bus/network 106 consists of a high-speed, high-bandwidth, unidirectional ring topology having a packet-based protocol. This bus/network establishes a point-to-point connection. The term "hyperpipe" has been coined to represent the digital backbone connecting all the rendering pipes. The requests are sent sequentially through bus/network 106 to each of the nodes. When a node receives a request, it examines that request to determine whether it is the one which has been designated to service that request In other words, the request contains information specifying which of the nodes contains the desired data. For example, if the desired data were generated by and stored in node 103, then consumer 101 would generate a request. This request is then sent over bus 106 in the format of a packet. Assuming a unidirectional clockwise transmission over bus 106, node 102 would be the first node to receive the request packet. Node 102 quickly checks the packet to determine whether the associated request was designated for it. A designation (e.g., an address) specifying the appropriate node can be contained in the header of the request packet. Since node 102 is not the intended recipient of that request, node 102 simply ignores the packet. Thereupon, the packet proceeds back through the bus 106 to the next downstream node 103. Node 103 examines the packet and determines that the request is destined for it. Thereupon, node 103 retrieves the requested data from its local memory (e.g., frame buffer) and sends the data in the form of packets over bus 106 destined to consumer 101. The request packet is then sent to node 104, which checks the request packet and ignores it. Consumer 101 continuously generates requests for data. As the data for a frame is received, consumer 101 draws the image out display (CRT) screen 107.

It should be noted that there are latencies associated with transmitting packets over various segments of bus 106. The latencies between nodes may also vary. Further latencies are incurred locally by nodes checking received requests, processing requests, and sending data over bus 106 to the consumer. It is known that high latencies do not pose a major problem because the penalty associated with the high latency is paid once at the beginning. Thereupon, no additional delays will be incurred. All processing is essentially shifted time-wise by the latency. However, if the latency is not constant, then one must add FIFO (first-in-first-out) buffers to temporarily hold the data because, due to the variable latencies, it is not known exactly when the data might be received. Larger FIFO buffers must be used to account for greater variances in the latencies. In order to minimize the overhead and costs associated with having large FIFO's, it is a design criteria to keep the latencies as constant as possible. The present invention accomplishes this by using a unidirectional ring topology. This ensures that all requests/data response packets incur approximately the same fixed latency. In other words, each request/data response packet will incur the fixed latency associated with a full loop around bus 106 plus the local node latency for processing the request. For example, a request from consumer node 101 designated for node 102 will incur a latency associated with traversing span 108 of bus 106 to node 102. A local latency associated with node 102 for processing the request is then incurred. Additional latencies are incurred by the data packets traversing through spans 109–111 of bus 106 back to consumer node 101. Likewise, if the request were intended for node 104, the same approximate latency would be incurred. In this case, the request would incur latencies for traversing through spans 108 and 109, local latency associated with node 104, and latency for the data traversing through span 111. A request for data which happens to reside with the consumer node, nonetheless is required to be routed all the way through the entire bus loop to ensure that it too incurs relatively the same latency. Hence, all request/data packets, regardless of node designations, experience the same bus loop (e.g., spans 10–111) latency plus local latency.

Furthermore, by implementing a unidirectional loop topology, all the latencies are known. This allows the system to issue requests in advance of when the data is actually needed. For example, suppose that the latency has been measured or quantitatively determined to be X number of clock cycles. Suppose also that consumer node 101 desires data from node 103 at a particular point in time Y. Consumer node 101 would issue a request for this data X number of clock cycles before time Y. Thereby, the data would arrive just in time. There may be tolerances within the system which might skew the results several clock cycles in either direction. A small FIFO is implemented to store data in case the data comes early. By predicting, anticipating, and generating requests early, the effects of the latencies are minimized.

The advantages conferred by the present invention are several fold in that it eliminates the need to switch drivers (i.e., no scintillation's). Also, since there is just one controller for driving the display, the colors and intensities are well balanced. Furthermore, multiple nodes/pipes can be merged together to help in rendering a single frame, thereby allowing parallel processing of complex images. In addition, this architecture is adapted to be easily scaled up or down according to cost, speed, and rendering constraints.

Figure 2:
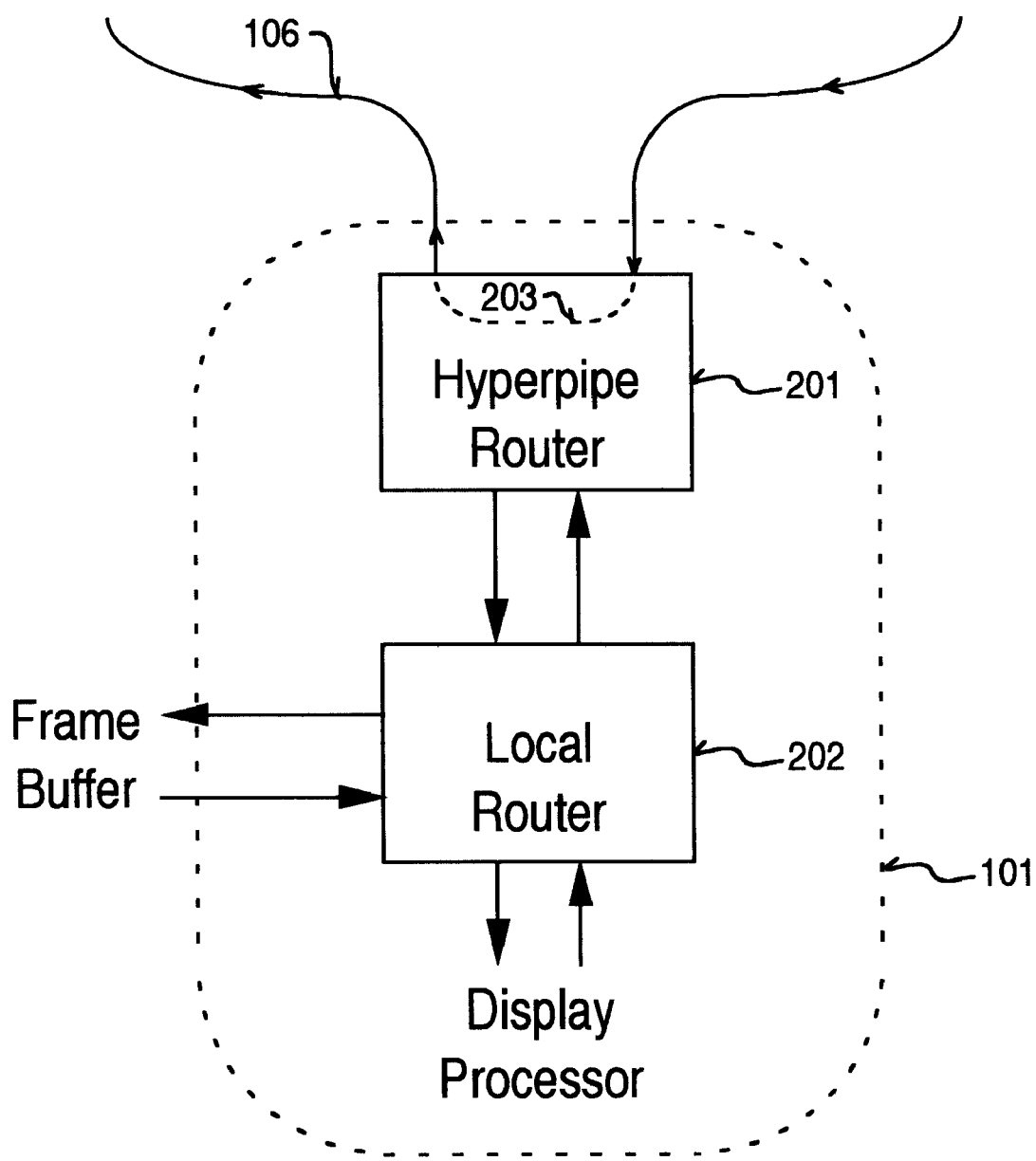
FIG. 2 shows a diagram depicting the flow of packets on the hyperpipe bus/network into, through, and out from an exemplary node/rendering pipe.

FIG. 2 shows a diagram depicting the flow of packets on the hyperpipe bus/network 106 into, through, and out from an exemplary node/rendering pipe 101. A packet on hyperpipe bus 106 is input to node 101. The packet is examined by a hyperpipe router 201. Hyperpipe router 201 examines the address in the packet's header to determine whether that packet is intended for node 101. If the packet is not intended for node 101, it is immediately forwarded back onto the hyperpipe bus 106 through path 203. However, if the packet was intended for node 101, it is routed to a local router 202 which directs the packet to the appropriate circuit within node 101 (e.g., the rasterizer). Packets originating from node 101 (e.g., request packets or data packets), are forwarded from local router 202 to hyperpipe router 201 for transmission onto hyperpipe bus 106.

Figure 3:
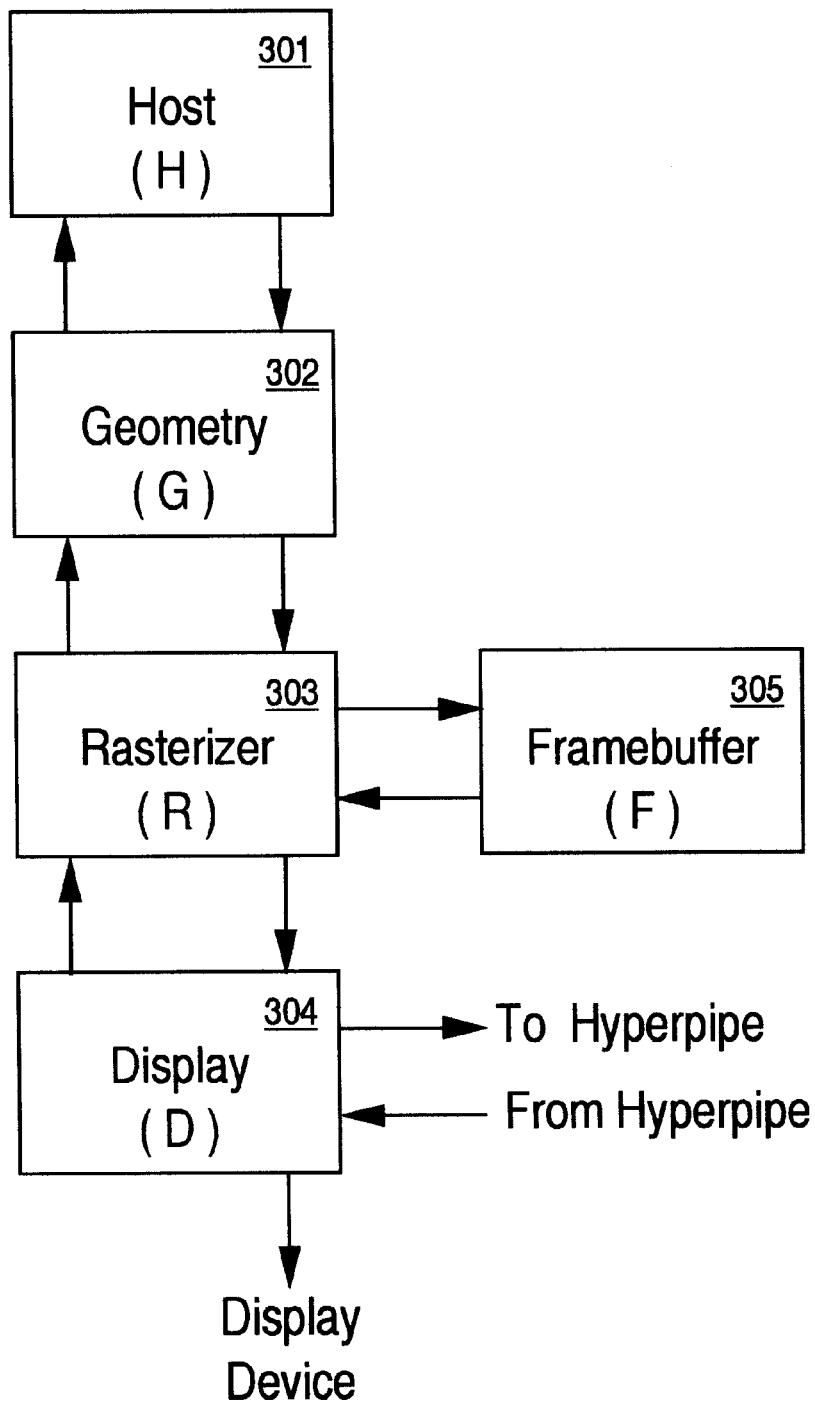
FIG. 3 shows a block diagram of the currently preferred embodiment of a node or rendering pipe.

FIG. 3 shows a block diagram of the currently preferred embodiment of a node or rendering pipe. An application program running on host processor (H) 301 directs the rendering process. The application program provides the high-level instructions and data to be used in the rendering process. This information is passed on to a geometry engine (G) 302, which performs the arithmetic operations on vertices. The vertices are then filled by a rasterizer block (R) 303. Rasterizer 303 performs color, blending, anti-aliasing, scan-conversion, depth, texture, lighting, and fog functions. The final pixel values are stored in framebuffer (F) 305. When requested, the appropriate pixel values are read from framebuffer 305 by display block (D) 304 and put out onto the hyperpipe bus or drawn out for display onto a CRT screen. It should be noted that nodes and hyperpipes can have many different types of configurations. Any standard type of 3-D graphics subsystem can be adapted to be used in conjunction with the present invention.

Figure 4:
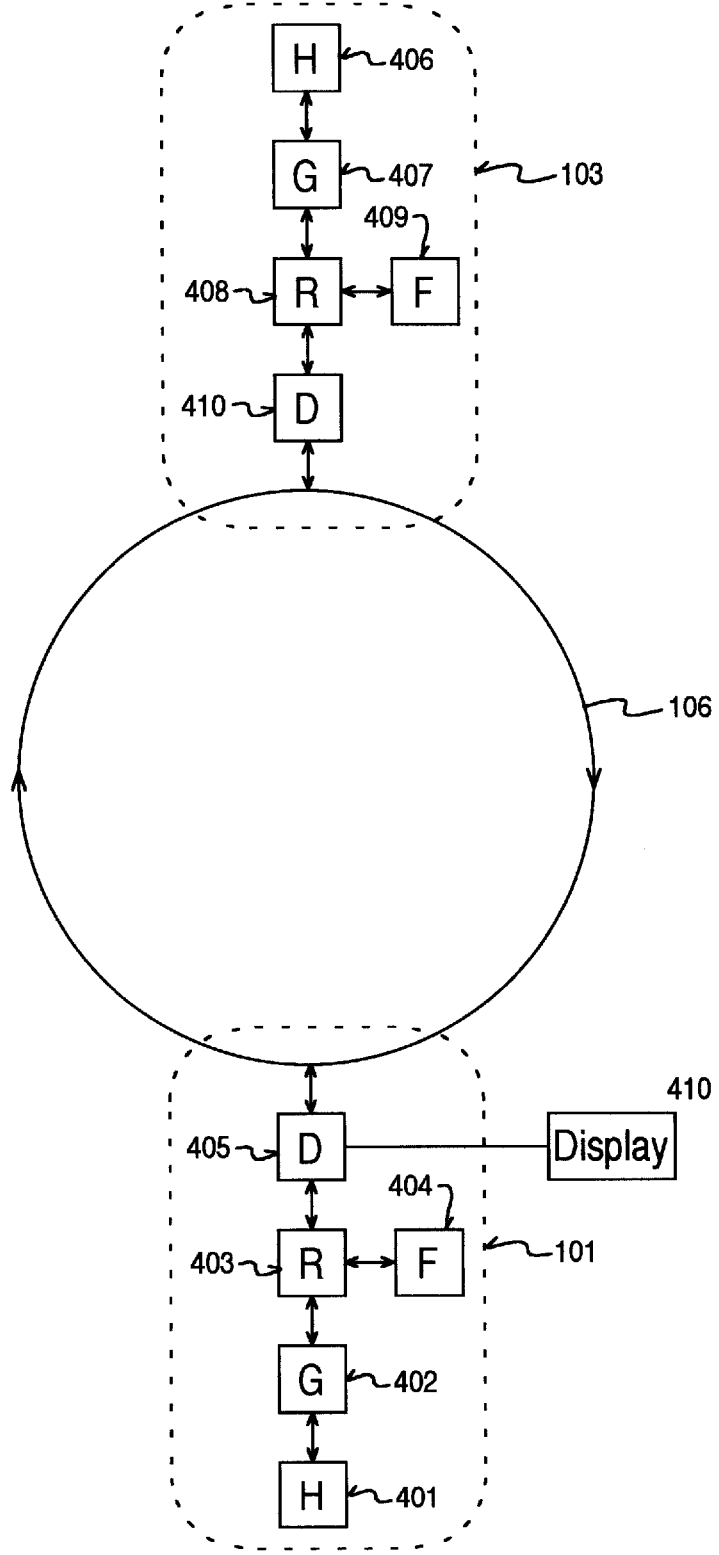
FIG. 4 shows a hyperpipe computer system having two nodes.

FIG. 4 shows a hyperpipe computer system having two nodes 101 and 103. Node 101 consists of a host 401 coupled to a geometry engine 402. The geometry engine 402 is coupled to rasterizer 403. Pixels generated by rasterizer 403 are stored in frame buffer 404. A display block 405 controls the movement of packets to/from hyperpipe bus 106. Furthermore, if node 101 is a consumer node, then display block issues requests and draws images out to a display screen. Likewise, node 103 is essentially the same, hardware-wise, as node 101. Node 103 consists of a host 406 coupled to a geometry engine 407. The geometry engine 407 is coupled to rasterizer 408. Pixels generated by rasterizer 408 are stored in frame buffer 409. A display block 410 controls the movement of packets to/from hyperpipe bus 106. When a request packet destined for node 103 is received, display block 410 reads the requested pixel data from its local frame buffer 409, packetizes the data, and sends it onto hyperpipe bus 106 for transmission to node 101. The display block 405 of node 101 takes this packetized data, processes it, and sends it to display device 410. Additional nodes, identical to node 103, can be added and coupled to hyperpipe bus 106 to get attain even greater and faster rendering capabilities.

Figure 5:
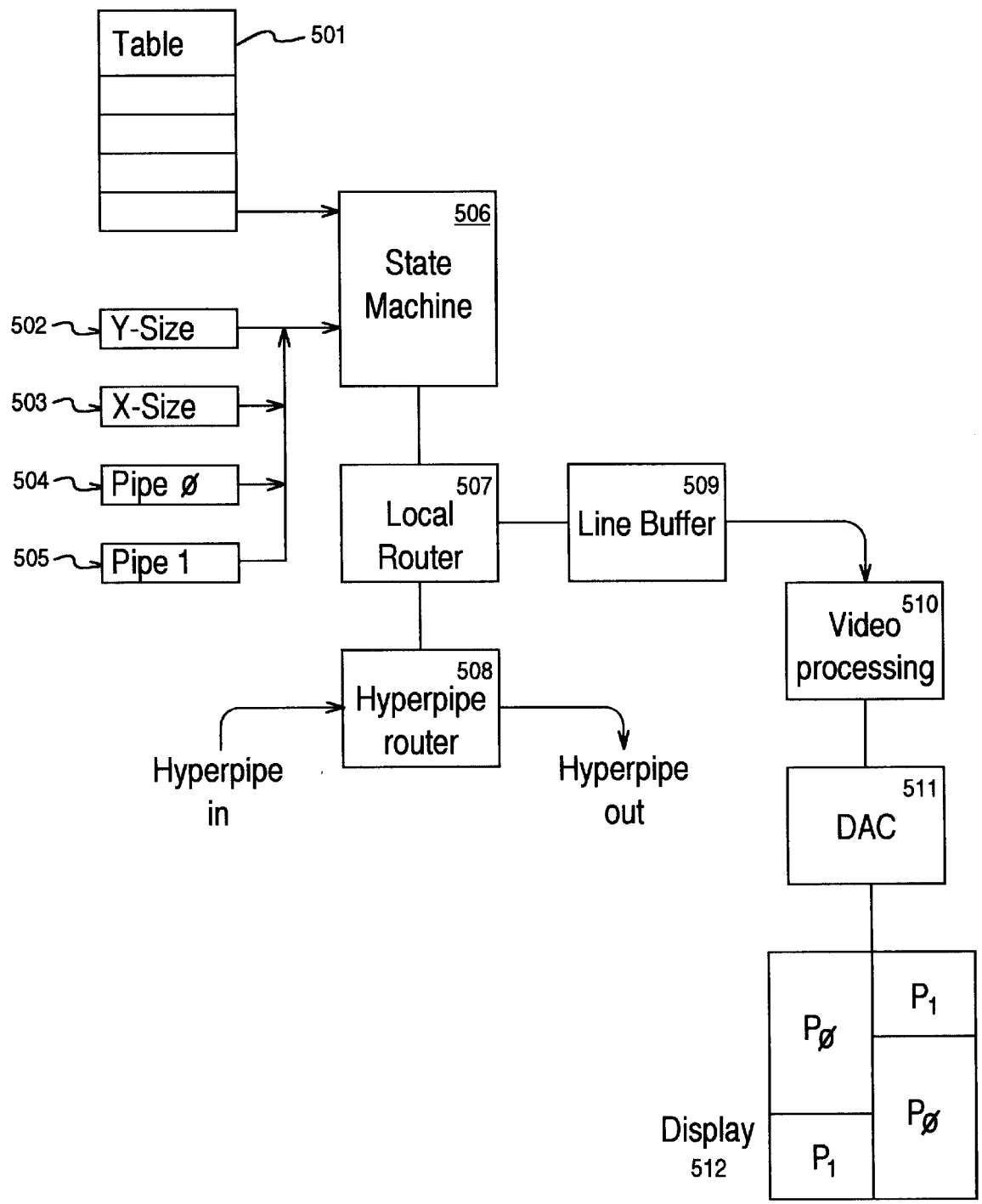
FIG. 5 shows a block diagram of a display controller for a consumer node.

FIG. 5 shows a block diagram of a display controller for a consumer node. The display controller consists of a table 501, several registers 502–505, and a state machine 506. A small local memory is used to store table 501 which contains parameters for video formats which change from field to field or from frame to frame (e.g., interlace, interlace stereo, field sequential, stereo field sequential, etc.). A node may be instructed to contribute in the rendering of a portion of a frame. The portion of the frame is specified according to an X, Y coordinate system. Thereby, register 502 contains the Y-size coordinate, and register 503 contains the X-size coordinate. Registers 504 and 505 are small buffers for temporarily storing data from the various rendering pipes (e.g., pipe 0 and pipe 1). The information contained in table 501 and registers 502–505 are fed into a state machine 506 for processing. State machine 506 generates requests to the appropriate pipes by sending requests through local rough 507 to hyperpipe route 508. Responses arrive either over the hyperpipe route 508, or from the local pipe route 507. Data is merged in line buffer 509, processed in 510 and passed to an output device 511(e.g. A DAC). Note that the frame can have separate sections rendered by different nodes/rendering pipes. For example, for a two node/rendering pipe system, the display surface 512 is subdivided into four sections. Pipe 0 renders two sections, and pipe 1 renders two sections.

Figure 6:
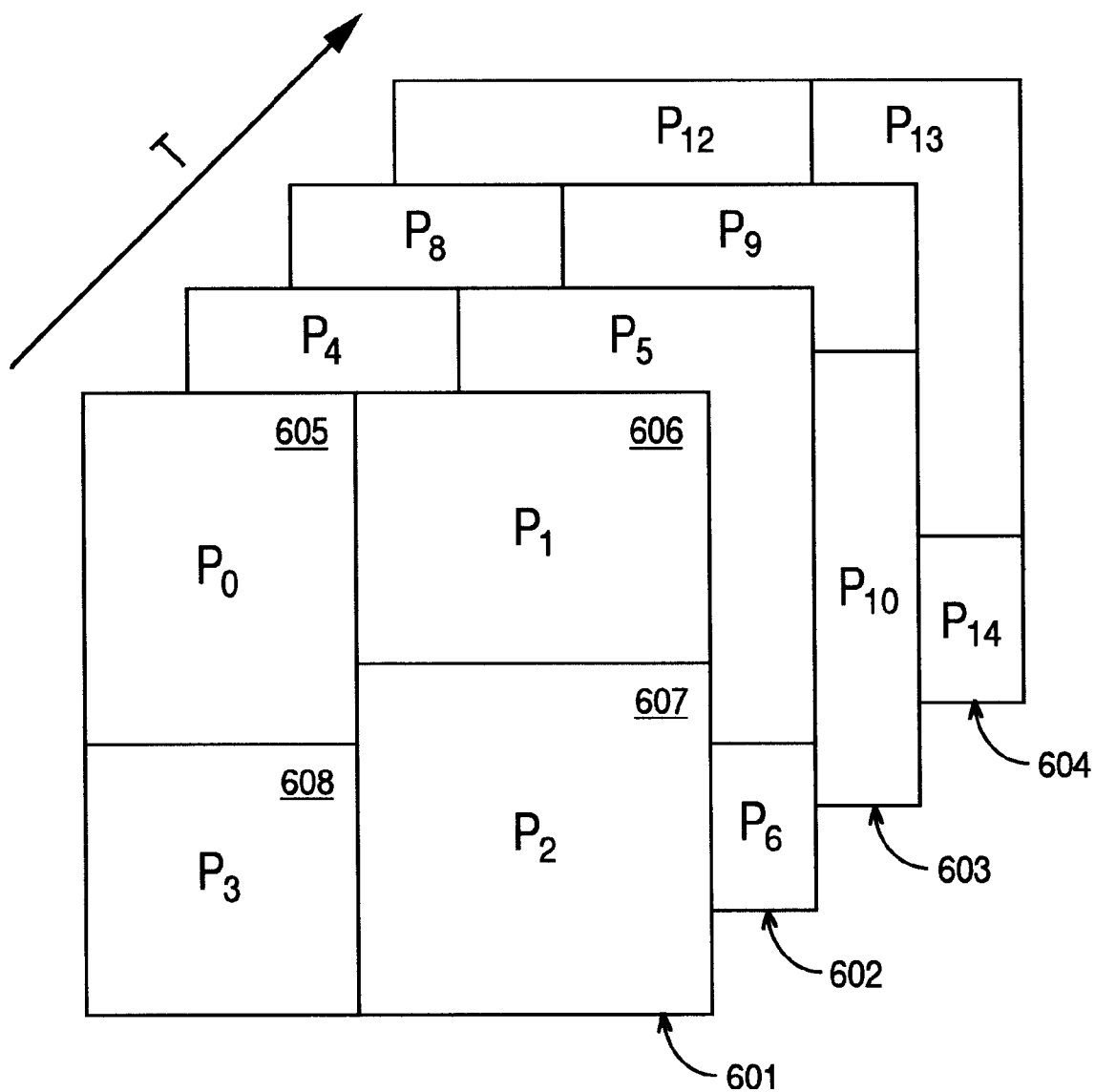
FIG. 6 is a diagram showing how multiple frames of images are rendered by multiple rendering pipes in a hyperpipe architecture.

FIG. 6 is a diagram showing how multiple frames of images are rendered by multiple rendering pipes in a hyperpipe architecture. Four frames 601–604 are shown. The frames are rendered at a standard 60 hertz rate (i.e., each frame is rendered every 1/60th of a second). A single frame can have one or more rendering pipes rendering pixels for that frame. For instance, frame 601 can have four rendering pipes P0–P3 rendering pixel data in unison. In other words, pipe P0 is rendering section 605 while pipe P1 is rendering section 606 and while pipes P2 and P3 are rendering sections 607 and 608. The pixels are then merged and displayed at the same time. Note that a frame need not be subdivided into equal portions. Instead, it is more efficient to subdivide the frame so that each rendering pipe shares approximately the same graphics rendering burden. Each rendering pipe should approximately render the same number of primitives. Meanwhile, one or more other rendering pipes can be rendering subsequent whole frames or subsequent portions of frames. For example, pipes P4–P7 can be rendering frame 602 while frame 601 is being rendered. It can be seen that frames can be rendered faster by adding additional rendering pipes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer system comprising:

a plurality of rendering pipes for rendering pixels of an image, wherein each of the rendering pipes comprises a host processor having an application program issuing graphics commands, a geometry circuit coupled to the host processor for processing primitives, a rasterizer coupled to the geometry circuit for generating pixel data, a frame buffer coupled to the rasterizer which stores the pixel data, an interface coupled to the rasterizer that accepts requests from the transmission medium and outputs pixel data;

a transmission medium coupling together each of the plurality of rendering pipes;

a controller coupled to one of the rendering pipes which coordinates pixel information of the image between each of the plurality of rendering pipes, wherein each of the rendering pipes is capable of rendering pixels for an entire frame or portions thereof;

a memory coupled to the controller for storing the pixel information;

a display coupled to the memory for displaying the image.

2. The computer system of claim 1, wherein the transmission medium comprises a uni-directional ring topology.

3. The computer system of claim 2, wherein the transmission medium comprises a point-to-point connection.

4. The computer system of claim 1, wherein the rendering circuit includes a local memory for storing pixel data generated locally.

5. The computer system of claim 4, wherein the controller requests the pixel data stored in the local memory.

6. The computer system of claim 5, wherein the controller merges pixel data received from a plurality of rendering circuits before drawing the image for display.

7. The computer system of claim 1 wherein the rendering circuit is further comprised of a router which examines packets from the transmission medium and routes the packets according to address information contained in the packets.

8. The computer system of claim 1 further comprising a single display driver which drives the display.

9. The computer system of claim 1, wherein the controller generates requests a pre-determined amount of clock cycles ahead of when pixel data is actually needed.

10. The computer system of claim 9, wherein the pre-determined amount of clock cycles is approximately equal to a fixed latency.

11. In a computer system, a method of rendering a three-dimensional image for display comprising the computer-implemented steps of:

rendering pixels of a three-dimensional image, wherein a plurality of rendering circuits are used to render portions of a single frame and each of the rendering pipes is capable of rendering pixels for an entire frame or portions thereof;

executing an application program on a host processor which issues graphics commands;

processing vertices by a geometry circuit coupled to the host processor;

generating pixel data through a rasterizer coupled to the geometry circuit;

storing the pixel data in a frame buffer coupled to the rasterizer;

accepting requests from the transmission medium for the pixel data;

outputting the pixel data onto the transmission medium;

storing pixel data in a plurality of memories, each rendering circuit storing pixel data generated in a local memory;

transmitting a request through a transmission medium coupling together each of the plurality of rendering circuits;

transmitting pixel data from one of the rendering circuits through the transmission medium to a frame buffer in response to the request;

merging pixel data received from a plurality of the rendering circuits into a frame;

driving a display coupled to the frame buffer to display the three-dimensional image.

12. The method of claim 11, wherein the transmission medium comprises a uni-directional ring topology.

13. The method of claim 12, wherein the transmission medium comprises a point-to-point connection.

14. The method of claim 11, wherein each of the rendering circuits performs the executing, processing, generating, storing, accepting, and outputting steps.

15. The method of claim 11, further comprising the step of routing packets from the transmission medium according to address information contained in the packets.

16. The method of claim 11 further comprising the step of driving the display with a single driver.

17. The method of Claim 11 futher comprising the step of generating requests at a pre-determined number of clock cycles ahead of when pixel data is actually needed.

18. The method of claim 17, wherein the pre-determined number of clock cycles is approximately equal to a fixed latency corresponding to the computer system.

* * * * *